(12) United States Patent
Zuczek

(10) Patent No.: US 10,929,464 B1
(45) Date of Patent: Feb. 23, 2021

(54) EMPLOYING ENTROPY INFORMATION TO FACILITATE DETERMINING SIMILARITY BETWEEN CONTENT ITEMS

(71) Applicant: Google Inc., Mountain View, CA (US)

(72) Inventor: Pawel Zuczek, Adliswil (CH)

( * ) Notice: Subject to any disclaimer, the term of this patent is extended or adjusted under 35 U.S.C. 154(b) by 542 days.

(21) Appl. No.: 14/613,752

(22) Filed: Feb. 4, 2015

(51) Int. Cl.
G06F 16/38 (2019.01)
G06F 16/738 (2019.01)
G06F 16/245 (2019.01)

(52) U.S. Cl.
CPC .......... *G06F 16/738* (2019.01); *G06F 16/245* (2019.01)

(58) Field of Classification Search
CPC ......... G06F 17/30864; G06F 17/30867; G06F 17/30675; G06F 17/30696; G06Q 30/02
USPC .......................................................... 707/723
See application file for complete search history.

(56) References Cited

U.S. PATENT DOCUMENTS

| | | | | |
|---|---|---|---|---|
| 2002/0083060 A1* | 6/2002 | Wang | ...................... | G10L 17/26 704/E15.045 |
| 2003/0086341 A1* | 5/2003 | Wells | ...................... | G10L 15/26 369/13.56 |
| 2004/0061702 A1* | 4/2004 | Kincaid | .................. | G06F 19/26 345/440 |
| 2005/0071377 A1* | 3/2005 | Mihcak | ................ | G10H 1/0058 707/999.107 |
| 2007/0124698 A1* | 5/2007 | Majumder | ............. | G06Q 30/02 715/811 |
| 2008/0208891 A1* | 8/2008 | Wang | ...................... | G10L 17/26 707/999.102 |
| 2009/0290764 A1* | 11/2009 | Fiebrink | ........... | G06F 17/30743 382/124 |
| 2009/0292701 A1* | 11/2009 | Saoudi | ................ | G06F 16/7854 707/999.006 |
| 2009/0299926 A1* | 12/2009 | Garrity | ................... | G06F 19/24 706/14 |

(Continued)

OTHER PUBLICATIONS

Baluja, S., et al., "Content Fingerprinting Using Wavelets," 3rd European Conference on Visual Media Production (CVMP 2006), Part of the 2nd Multimedia Conference 2006, 10 pages.

(Continued)

*Primary Examiner* — Pierre M Vital
*Assistant Examiner* — Andrew N Ho
(74) *Attorney, Agent, or Firm* — Young Basile Hanlon & MacFarlane, P.C.

(57) ABSTRACT

Systems and techniques for generating and/or configuring a similarity heat map representative of similarities between two data sets are presented. The system can include an input component, a similarity component and a mapping component. The input component receives a first data set associated with a first media item and a second data set associated with a second media item. The similarity component computes similarity between a data value of the first data set and a corresponding data value of the second data set. The mapping component configures a data point of a similarity map to represent a match between the data value and the corresponding data value in response to a determination that information associated with the similarity does not match previously determined information associated with another similarity between another data value of the first data set and another corresponding data value of the second data set.

17 Claims, 11 Drawing Sheets

(56) References Cited

U.S. PATENT DOCUMENTS

| | | | | |
|---|---|---|---|---|
| 2010/0125553 A1* | 5/2010 | Huang | ............... | H03M 7/3091 707/661 |
| 2010/0306193 A1* | 12/2010 | Pereira | ............... | G06K 9/00758 707/728 |
| 2010/0332475 A1* | 12/2010 | Birdwell | ............. | G06K 9/6224 707/737 |
| 2011/0222787 A1* | 9/2011 | Thiemert | ........... | G06K 9/00758 382/225 |
| 2011/0246741 A1* | 10/2011 | Raymond | ........... | G06F 16/1752 711/170 |
| 2012/0044265 A1 | 2/2012 | Khorashadi et al. | | |
| 2012/0226691 A1* | 9/2012 | Edwards | ............ | G06K 9/00744 707/737 |
| 2013/0013603 A1* | 1/2013 | Parker | ............... | G06F 17/30707 707/737 |
| 2013/0054603 A1* | 2/2013 | Birdwell | ............. | G06K 9/6224 707/738 |
| 2014/0330413 A1* | 11/2014 | Anniballi | ............. | G06F 16/638 700/94 |
| 2016/0021333 A1 | 1/2016 | Linn et al. | | |

OTHER PUBLICATIONS

Ioffe, S., "Improved Consistent Sampling, Weighted Minhash and L1 Sketching," IEEE 10th International Conference on Data Mining (ICDM), Dec. 13-17, 2010, 10 pages.

Media Hedge, "Digital Fingerprinting," White Paper, Civolution and Gracenote, 2010, Last accessed Jul. 31, 2012, 12 pages.

Milano, Dominic, "Content Control: Digital Watermarking and Fingerprinting," White Paper, Rhozet, a business unit of Harmonic Inc., Last accessed Jul. 31, 2012, 11 pages.

Lu, Jian, "Video fingerprinting for copy identification: from research to industry applications," Proceedings of SPIE—Media Forensics and Security XI, vol. 7254, Jan. 2009, 16 pages.

Lu, Jian, "Video Fingerprinting and Applications: a review," Media Forensics & Security Conference, 2009, San Jose, CA, 31 pages.

Lin, W., et al., "A Heat-Map Based Algorithm for Recognizing Group Activities in Videos", IEEE Transactions on Circuits and Systems for Video Technology, 2013, vol. 23, Issue: 11, pp. 1980-1992.

Blignaut, P., "Visual Span and Other Parameters for the Generation of Heatmaps", Department of Computer Science and Informatics, University of the Free State, South Africa, ETRA '10 Proceedings of the 2010 Symposium on Eye-Tracking Research & Applications, pp. 125-128.

* cited by examiner

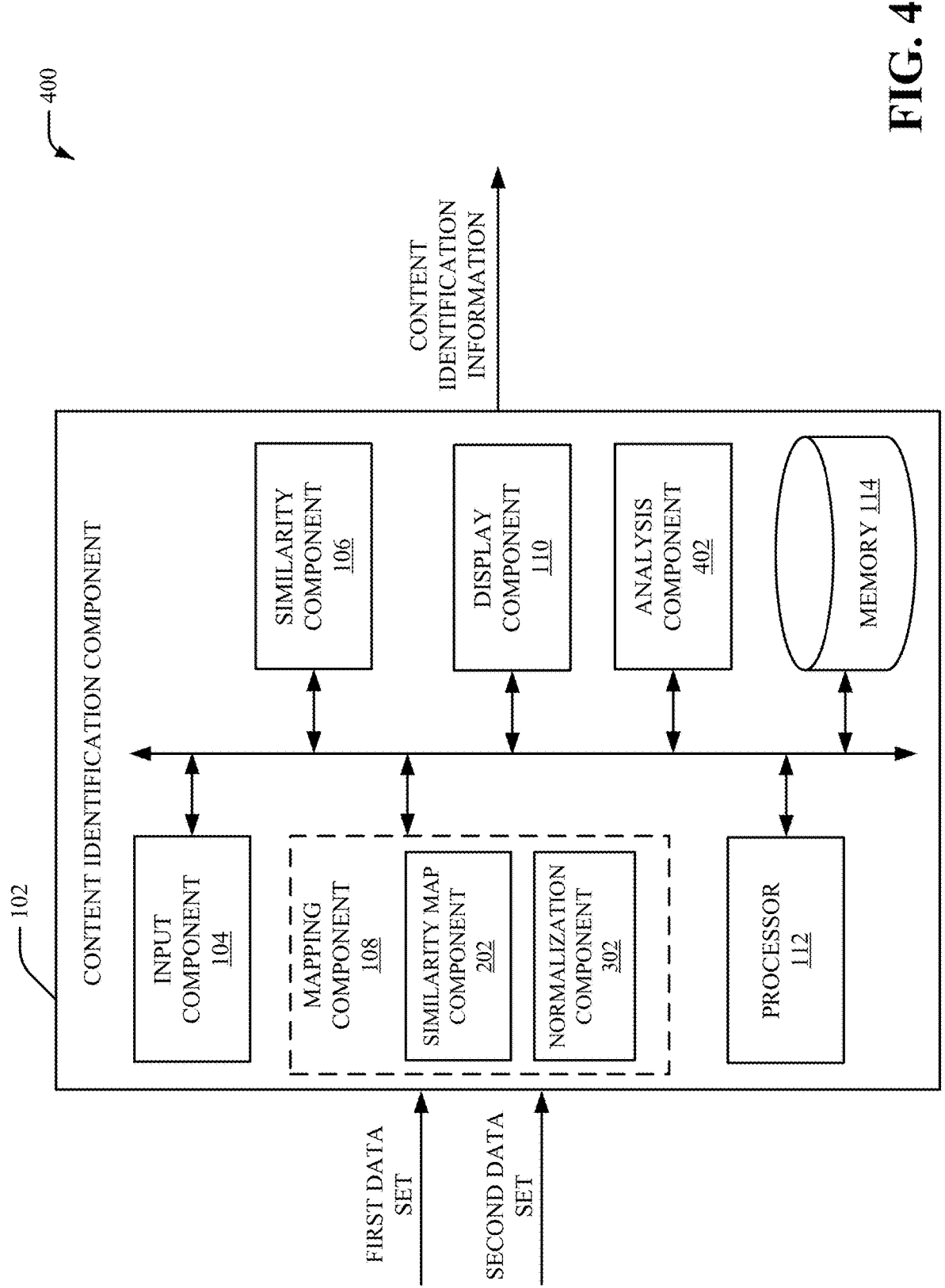

EMPLOYING ENTROPY INFORMATION TO FACILITATE DETERMINING SIMILARITY BETWEEN CONTENT ITEMS

TECHNICAL FIELD

This disclosure relates generally to media content, and more specifically, to employing entropy information to facilitate determining similarity between content items.

BACKGROUND

A heat map is an abstract representation of correspondence between two data sets. Heat maps are often employed to compare and analyze categorical data. For example, the cluster heat map is a display of a data matrix that reveals row and column hierarchical cluster structure in the data matrix. It consists of a rectangular tiling with each tile configured to represent the value of the corresponding element of the data matrix. Within a relatively compact display area, it facilitates inspection of row, column and joint cluster structure. The cluster heat map compacts large amounts of information (e.g., several thousand rows/columns) into a small space to bring out coherent patterns in the data.

Identification of patterns formed via variations and clusters of data points in a heat map can reveal various correlations between data sets. Moreover, various techniques have evolved to facilitate automated heat map analysis and pattern identification. However, many of these techniques for heat map analysis and pattern identification are insufficient. Furthermore, heat maps are generally associated with redundant information (e.g., redundant patterns, etc.). As a result, many heat map techniques produce false positives (e.g., identification of patterns that are non-representative of an accurate data correlation) for matching media content information.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes an input component, a similarity component and a mapping component. The input component receives a first data set associated with a first media item and a second data set associated with a second media item. The similarity component computes similarity between a data value of the first data set and a corresponding data value of the second data set. The mapping component configures a data point of a similarity map to represent a match between the data value and the corresponding data value in response to a determination that information associated with the similarity between the data value and the corresponding data value does not match previously determined information associated with another similarity between another data value of the first data set and another corresponding data value of the second data set.

Additionally, a non-limiting implementation provides for receiving data associated with a first media item and other data associated with a second media item, computing a similarity score associated with a hash value from the data and a corresponding hash value from the other data, and configuring a data point of a similarity map to represent a match between the hash value and the corresponding hash value in response to a determination that information associated with the similarity score does not match previously determined information associated with another similarity score related to another hash value from the data and another corresponding hash value from the other data.

In accordance with another implementation, a non-transitory computer readable storage medium comprising computer-executable instructions, that in response to execution, cause a computing system to perform operations, comprising: receiving a first data set associated with a first video and a second data set associated with a second video, determining similarity between a data value of the first data set and a corresponding data value of the second data set, and configuring a data point of a similarity heat map to represent a match between the data value and the corresponding data value in response to a determination that information associated with the similarity does not match previously determined information associated with another similarity between another data value of the first data set and another corresponding data value of the second data set.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which:

FIG. 4 illustrates a high-level block diagram of yet another example content identification component, in accordance with various aspects and implementations described herein;

FIGS. 5A-B illustrate example similarity heat maps;

DETAILED DESCRIPTION

Figure 1:
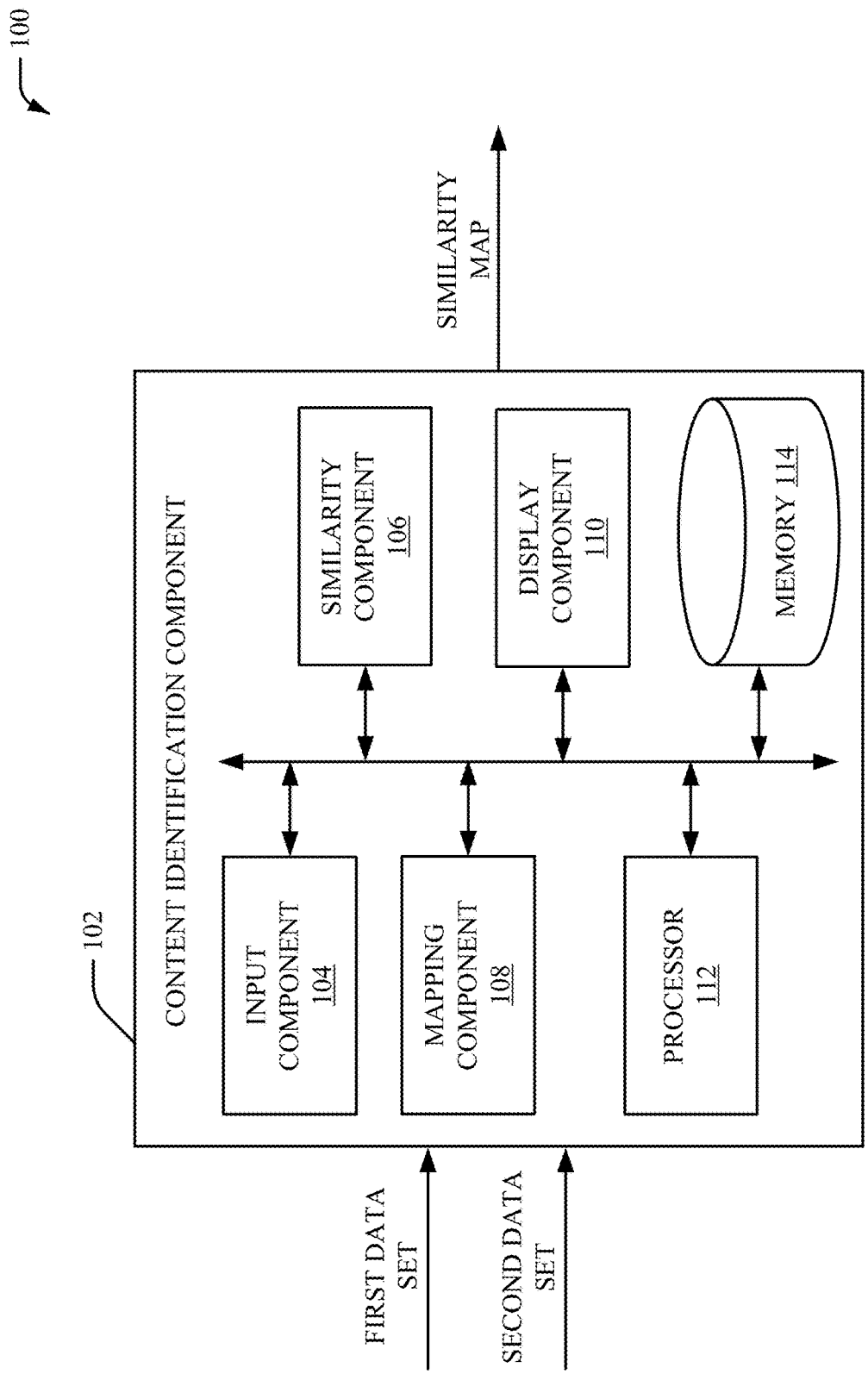
FIG. 1 illustrates a high-level block diagram of an example content identification component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

A heat map is an abstract representation of correspondence between two data sets. Heat maps are often employed to compare and analyze categorical data. For example, the cluster heat map is a display of a data matrix that reveals row and column hierarchical cluster structure in the data matrix. It consists of a rectangular tiling with each tile configured to represent the value of the corresponding element of the data matrix. Within a relatively compact display area, it facilitates inspection of row, column and joint cluster structure. The cluster heat map compacts large amounts of information (e.g., several thousand rows/columns) into a small space to bring out coherent patterns in the data.

Identification of patterns formed via variations and clusters of data points in a heat map can reveal various correlations between data sets. Moreover, various techniques have evolved to facilitate automated heat map analysis and pattern identification. However, many of these techniques for heat map analysis and pattern identification are insufficient. Furthermore, heat maps are generally associated with redundant information (e.g., redundant patterns, etc.). As a result, many heat map techniques produce false positives (e.g., identification of patterns that are non-representative of an accurate data correlation) for matching media content information.

To that end, techniques for generating and/or configuring a similarity map (e.g., a similarity heat map) representative of similarities between two data sets are presented. In particular, the disclosed subject matter relates to generation of a similarity heat map that compares similarities between two data sets, such as data sets representative of two images, two songs, two videos, two documents, etc. The similarity heat map can be employed and/or analyzed, in certain implementations, to identify overlapping portions or matches between one or more aspects of media content represented by the respective data sets. The similarity heat map can be, for example, an image that shows how similar a first video is to a second video at each point in time. The similarity heat map can be configured to account for number of data points that are associated with the same information in the two data set. In one example, the similarity heat map can be configured so that each new piece of information associated with the two data sets occurs exactly once. Therefore, matches between one or more aspects of media content that are computed using such similarity (e.g., the similarity heat map) can be associated with greater precision and/or speed. Moreover, the similarity heat map can be associated with less data, less storage requirements and/or less complexity as compared to conventional heat maps.

In an aspect, a scoring function can be employed to determine whether a match between two data sets is a true positive match. A match can be a range of data within a first data set that is similar to another range of data within a second data set. Therefore, both the first data set and the second data set can share common content (e.g., have similar content) over the ranges of data when a match occurs. The scoring function can account for number of data points in both data sets that are associated with the same information. The scoring function can be a non-linear function that accounts for number of data points associated with and/or identified based on the same information. In one example, only a first data point associated with particular information is considered for the scoring function and other data points associated with the particular information are ignored. The scoring function can be associated with a higher score when the number of data points (e.g., the number of data points in both data sets that are associated with the same information) is similar. In an implementation, the scoring function can be employed to determine probability that a portion of a heat map is a true positive match. Therefore, accuracy of determined matches between one or more aspects of media content can also be improved.

Referring initially to FIG. 1, there is illustrated an example system 100 that generates and/or configures a similarity map (e.g., a similarity heat map) representative of similarities between two data sets, according to an aspect of the subject disclosure. In one example, the system 100 can be implemented on or in connection with at least one server (e.g., at least one server that hosts user-uploaded media content). The system 100 can be employed by various systems, such as, but not limited to media content systems, media content matching systems, media sharing systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, and the like.

Specifically, the system 100 can provide a content identification feature with an input feature (e.g., input component 104), a similarity feature (e.g., similarity component 106), a mapping feature (e.g., mapping component 108) and/or a display feature (e.g., display component 110) that can be utilized in and/or in connection with, for example, a content identification application. The input feature can receive a first data set associated with a first media item and a second data set associated with a second media item. The similarity feature can compute similarity between a data value of the first data set and a corresponding data value of the second data set. The mapping feature can configure a data point of a similarity map to represent a match in response to a determination that information associated with the similarity between the data value and the corresponding data value does not match previously determined information associated with another similarity between another data value of the first data set and another corresponding data value of the second data set. In certain implementations, the system 100 can include the display feature. The display feature can display the similarity map on a display screen of a device.

In particular, the system 100 can include a content identification component 102. In FIG. 1, the content identification component 102 includes an input component 104, a similarity component 106, a mapping component 108 and/or a display component 110. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 114 for storing computer executable components and instructions. System 100 can further include a processor 112 to facilitate operation of the instructions (e.g., computer executable components and instructions) by system 100.

Aspects of system 100, (and additional systems described herein) are exemplified herein in association with processing of data sets representative of two media items, or portions of the two media items, to facilitate identifying same or substantially similar media content included in the respective media items. The content identification component 102 (e.g., the input component 104) can receive a first data set associated with a first media item (e.g., FIRST DATA SET shown in FIG. 1) and a second data set associated with a second media item (e.g., SECOND DATA SET shown in FIG. 1). For example, the first data set and the second data set can be two data sets representative of two different media items or portions of the two different media items. The first media item (e.g., the first data set) and the second media item (e.g., the second data set) can potentially include matching content. The first media item can be a scrutinized media item that has been detected to potentially include same or similar media content as reference media content (e.g., the second media item). The first media item can be associated with and/or stored on at least one server (e.g., a remote server, a media content server, etc.) prior to being received by the content identification component 102 (e.g., the input component 104). In another example, a user device can transmit (e.g., directly transmit or indirectly transmit) the first media item to the content identification component 102 (e.g., the input component 104). The first media item can be, for example, an uploaded media file (e.g., a media file uploaded to a media sharing platform, a media file uploaded to at least one server, etc.). A user device can include a computer, a laptop computer, a mobile device, a handheld device, a cellular phone (e.g., a smartphone), a tablet, an interactive television, an internet-connected television, a set-top box, a streaming media device, a wearable computing device, a camera, a personal digital assistant (PDA), an electronic reader (e-reader), a portable computing device, a gaming device, another type of media capable device, etc. The first media item can include one or more types of media content. For example, the first media item can include video (e.g., a video file, a video clip, a video segment, a video sample, etc.) and/or audio (e.g., an audio file, an audio clip, an audio sample, a music file, a music clip, a music sample, a song, a sound, a dialogue, etc.). It is to be appreciated that the first media item can be in any recognizable media file format (e.g., video file format and/or audio file format), codec compression format, etc.

The second media item can be a reference media item. The second media item and/or information associated with the second media item (e.g., the second data set) can be stored in a database (e.g., a reference database). The second media item can also include one or more types of media content. For example, the second media item can include video (e.g., a video file, a video clip, a video sample, etc.) and/or audio (e.g., an audio file, an audio clip, an audio sample, a music file, a music clip, a music sample, a song, a sound, a dialogue, etc.). It is to be appreciated that the second media item can be in any recognizable media file format (e.g., video file format and/or audio file format), codec compression format, etc. In an example, the first media item can be detected by an early content matching system that provides a cursory comparison between a scrutinized media item and a reference index that includes thousands to millions (and potentially innumerable) of data files representing reference media content.

The first data set and/or the second data set can be generated based on a feature detection technique. In an aspect, the first data set and/or the second data set can be associated with spectrogram data and/or content fingerprint data. For example, the first data set and/or the second data set can be associated with, audio spectrogram data, video spectrogram data, audio fingerprint data and/or video fingerprint data. In another aspect, the first data set and/or the second data set can be associated with a set of min-hash signatures for audio data and/or video data. An audio spectrogram can be generated based on audio channel data of a media file (e.g., the first media file and/or the second media file). For example, an audio spectrogram can represent audio channel data by plotting time on one axis and frequency on another axis. Similarly, a video spectrogram can be generated based on video channel data of a media file (e.g., the first media file and/or the second media file). For example, video spectrogram can represent video channel data by plotting time on one axis and frequency on another axis. Amplitude or intensity of a certain frequency at a certain time can also be incorporated into an audio spectrogram by using color and/or additional dimensions. As such, an audio spectrogram can be generated by combining respective measurements over time on a frequency axis to generate a spectrogram image of frequency amplitudes over time. In certain implementations, a spectrogram can be generated based at least in part on a short-time Fourier transform ("STFT"). For example, audio channel data and/or video channel data of a media file (e.g., the first media file and/or the second media file) can be partitioned into one or more time windows. Accordingly, each of the one or more time windows (e.g., the audio channel data and/or the video channel data) can be processed based at least in part on a STFT. Each of the one or more time windows can be Fourier transformed to calculate a magnitude of the frequency spectrum for the duration of each window. As such, an image of frequency amplitudes over time can be generated by combining a plurality of windows side by side on the time axis of a spectrogram. It is to be appreciated that other techniques, such as wavelet transforms, can also be used to construct a spectrogram.

In another aspect, the first media item and/or the second media item can be divided into a plurality of content fingerprints (e.g., a set of audio fingerprints and/or a set of video fingerprints). A set of audio fingerprints and/or a set of video fingerprints can be generated based at least in part on a hash technique (e.g., fingerprints in the set of audio fingerprints and/or the set of video fingerprints can be min-hashes). For example, a set of audio fingerprints can be generated based at least in part on a hash of a spectrogram window (e.g., a min-hash technique) of an audio spectrogram. Additionally or alternatively, a set of video fingerprints can be generated based in part on a hash of a window (e.g., a min-hash technique) associated with the video channel data. In one example, a locality sensitive hashing (LSH) scheme can be employed to generate a set of audio fingerprints and/or a set of video fingerprints. An LSH scheme can implement, in one example, a random hashing scheme. In an example, a min-hash (e.g., weighted min-hash, a min-wise independent permutation, etc.) can be implemented. As such, a set of audio fingerprints and/or a set of video fingerprints can be generated based on a hashing scheme. It is to be appreciated that other types of hashing schemes can be employed to generate a set of audio fingerprints and/or a set of video fingerprints. In one example, a combination of computer vision techniques and/or data stream processing algorithms can be implemented to generate a set of audio fingerprints and/or a set of video fingerprints. A set of audio fingerprints and/or a set of video fingerprints can be alternatively be generated based at least in part on wavelets (e.g., one or more wavelet vectors). In certain implementations, each content fingerprint (e.g., each audio fingerprint and/or each video fingerprint) can comprise a sequence of sub-fingerprints. A sub-fingerprint can be a data element that encodes data related to image features and/or audio features of a media item. For example, a sub-fingerprint can represent a media item (e.g., a video) at a particular time (e.g., a sub-fingerprint can include data associated with a particular time range for a video, etc.). In an implementation, a sub-fingerprint can comprise min-hash values based on the image features and/or audio features (e.g., a sub-fingerprint can comprise a vector of min-hash values, a sub-fingerprint can comprise a band of min-hash values, a sub-fingerprint can comprise a locality-sensitive hashing band of min-hash values, etc.).

In certain implementations, the input component 104 can receive the first media item and/or the second media item rather than receiving the first data set and/or the second data set. As such, the input component 104 can be configured to generate and/or process the first data set and/or the second data set (e.g., the input component 104 can employ one or more feature detection techniques, the input component 104 can generate spectrogram data and/or content fingerprint data associated with the first media item and/or the second media item, etc.).

The similarity component 106 can compute similarity between a data value of the first data set and a corresponding data value of the second data set. For example, the data value and the corresponding data value can be associated with a corresponding time range. Therefore, the data value of the first data set can be a range of data values and the corresponding data value of the second data set can be a corresponding range of data values. The similarity between the data value of the first data set and the corresponding data value of the second data set can be a similarity score (e.g., a similarity value, a min-hash band value score, etc.). In an implementation, the data value and the corresponding data value can be associated with spectrogram data and/or content fingerprint data. In order to compare and/or identify matching content between the first media item and the second media item, the similarity component 106 can compute similarity of each point in time in the first data set to each point in time in the second data set. For example, as mentioned above, the first data set and the second data set can each include content fingerprint data and/or spectrogram data associated with each point in time in the first media item and each point in time in the second media item. The similarity component 106 can compute, in one example, a score between feature detection information associated with the first media item and other feature detection information associated with the second media item.

In an aspect, the similarity component 106 can compute similarity between data (e.g., a range of data values) of the first data set and other data (e.g., a corresponding range of data values) of the second data set based on a distance metric. In one example, the similarity component 106 can compute similarity between data (e.g., a range of data values) of the first data set and other data (e.g., a corresponding a range of data values) of the second data set based on a Hamming distance. In another example, the similarity component 106 can compute similarity between data (e.g., a range of data values) of the first data set and other data (e.g., a corresponding a range of data values) of the second data set based on a Jaccard distance. However, other mechanisms for computing similarity between data (e.g., a range of data values) of the first data set and other data (e.g., a corresponding a range of data values) of the second data set can be employed. In another aspect, the similarity component 106 can compute the similarity based on spectrogram data and/or content fingerprint data associated with the first data set and the second data set. The similarity component 106 can compute the similarity, in one example, based on hashing scheme values (e.g., min-hash data values) of the first data set and corresponding hashing scheme values (e.g., corresponding min-hash data values) of the second data set.

In another aspect, the similarity component 106 can employ a scoring function to determine whether a match between data (e.g., a range of data values) of the first data set and other data (e.g., a corresponding a range of data values) of the second data set is a true positive match. For example, a match can be a range of data within the first data set that is similar to another range of data within the second data set. Therefore, both the first data set and the second data set can share common content (e.g., have similar content) over the ranges of data when a match occurs. The scoring function can be a non-linear function that accounts for number of data points that are associated with and/or identified based on the same information. In an example, the scoring function can account for number of data points in the first data set and the second data set that are associated with the same information. The scoring function can be associated with a higher score when the number of data points (e.g., the number of data points in the first data set and the second data set that are associated with the same information) is similar. In one example, only a first data point associated with particular information is considered for the scoring function and other data points associated with the particular information are ignored. Therefore, the scoring function associated with the similarity component 106 can be a non-linear function that employs entropy information rather than a linear scoring function that increases by the same amount each time a matching point is found. For example, the similarity component 106 can employ a non-linear function F that accounts for number of data points associated with the same information where a final score is equal to F(point1_similarity, point2_similarity), rather than employing a linear function where a final score is equal to point1_similarity+point2_similarity. The point1_similarity can correspond to, e.g., a similarity score for a first data point and the point2_similarity can correspond to, e.g., a similarity score for a second data point.

The mapping component 108 can generate and/or configure a similarity map (e.g., SIMILARITY MAP shown in FIG. 1) based on similarity information determined and/or generated by the similarity component 106. The mapping component 108 can, for example, configure a data point of a similarity map (e.g., a heat map, a similarity heat map, a high entropy heat map, etc.) to represent a match between data of the first data set and other data of the second data set (e.g., the data value and the corresponding data value) based on similarity information determined and/or generated by the similarity component 106. The similarity map can represent associations between two data sets (e.g., the first data set and the second data set). In an example where the first data set and the second data set are representative of two videos (or portions of two videos), a similarity map of similarity between the two videos can be generated. Information representative of similarities between respective parts of the first media item and the second media item can be mapped in a data matrix wherein one axis represents different parts of a first content item and a second axis represents different parts of another content item. A data entry at each coordinate or cell of the matrix can include a value representative of the degree of similarity (e.g., a similarity score) between respective parts of the two content items represented by the coordinates.

The mapping component 108 can configure a data point of a similarity map to represent a match between data of the first data set and other data of the second data set based on a score determined by a scoring function associated with the similarity component 106. Therefore, a similarity map generated and/or configured by the mapping component 108 can provide an improved estimation as to whether a match is a true positive match. Moreover, accuracy of matches between one or more aspects of media content can be improved. In certain aspects, the mapping component 108 can configure a data point of a similarity map to represent a match between data of the first data set and other data of the second data set in response to a determination that information associated with the data and the other data (e.g., a similarity score, a min-hash band value score, etc.) is not already included in and/or associated with the similarity map. In an aspect, the mapping component 108 can configure a data point of a similarity map to represent a match between data of the first data set and other data of the second data set in response to a determination that information associated with the similarity between the data and the other data does not match previously determined information associated with another similarity between the first data set and the second data set. The previously determined information can be previously determined by the similarity component 106 and/or can be information included in (e.g., previously added to) the similarity map.

The mapping component 108, in one example, can configure the data point of the similarity map to represent a match in response to a determination that information associated with feature detection data (e.g., spectrogram data and/or content fingerprint data) related to the similarity between data of the first data set and other data of the second data set does not match previously determined information associated with other feature detection data (e.g., other spectrogram data and/or other content fingerprint data) related to another similarity computed by the similarity component 106. In another example, the mapping component 108 can configure the data point of the similarity map to represent a match between data of the first data set and other data of the second data set in response to a determination that a hashing scheme value score (e.g., a min-hash data value score) associated with the similarity between data of the first data set and other data of the second data set does not match another hashing scheme value score (e.g., another min-hash data value score) associated with another similarity computed by the similarity component 106. In an aspect, the mapping component 108 can normalize the information associated with the similarity between data of the first data set and other data of the second data set and/or the mapping component 108 can normalize the previously determined information associated with the first data set and the second data set. Therefore, the similarity map generated and/or configured by the mapping component 108 can comprise similarity equal to a decreased value (e.g., 0) when data points associated with corresponding information are encountered. Additionally, all data points that are unmodified when identifying a probable match can be initially considered and then the scoring function can be applied to compute probability of the probable match being a true positive match. Furthermore, a single data point can be considered within a sequence of consecutive data points that are associated with the same information. Accordingly, a probability computation associated with a heat map can be improved, regardless of how the heat map was created.

In certain implementations, the display component 110 can display the similarity map on a display screen of a device. However, it is to be appreciated that the similarity map and/or information associated with the similarity map can be stored without being displayed on a display screen of a device. The display component 110 can generate a user interface (e.g., a display, a display screen) to present the similarity map and/or to present information associated with the similarity map. In an implementation, the display component 110 can be associated with a content identification application.

In a non-limiting example, a similarity function s(t_a, t_b) associated with the similarity component 106 (e.g., a scoring function employed by the similarity component 106) can generate a similarity value (e.g., a similarity score). The similarity value (e.g., the similarity score) can correspond to similarity between a video A at time t_a and a video B at time t_b. The similarity value (e.g., a similarity score, a min-hash band value score) can comprise values in a range from [0, 100] that correspond to number of min-hash bands that are identical for both video A and video B at given time points (e.g., time t_a and time t_b). The mapping component 108 can configure a similarity map based on number of data points in a first data set and a second data set (e.g., in a first data set for video A and a second data set for video B) that are associated with corresponding information. In an aspect, the mapping component 108 can configure a similarity map so that each similarity value (e.g., each similarity score, each min-hash band value score) only occurs in the similarity map once. For example, the mapping component 108 can configure a similarity map so that there is only a single hit for each unique min-hash band value score in the similarity map. Accordingly, the content identification component 102 can provide a similarity computation where each new piece of information occurs exactly once. Moreover, the content identification component 102 can inject entropy information into a similarity computation to facilitate determining similarity between content items and/or to improve precision for matching content items (e.g., to improve sequence alignment precision, etc.)

While FIG. 1 depicts separate components in system 100, it is to be appreciated that the components may be implemented in a common component. In one example, the input component 104, the similarity component 106, the mapping component 108 and/or the display component 110 can be included in a single component. Further, it can be appreciated that the design of system 100 can include other component selections, component placements, etc., to generate and/or configure a similarity map representative of similarities between two data sets.

Figure 2:
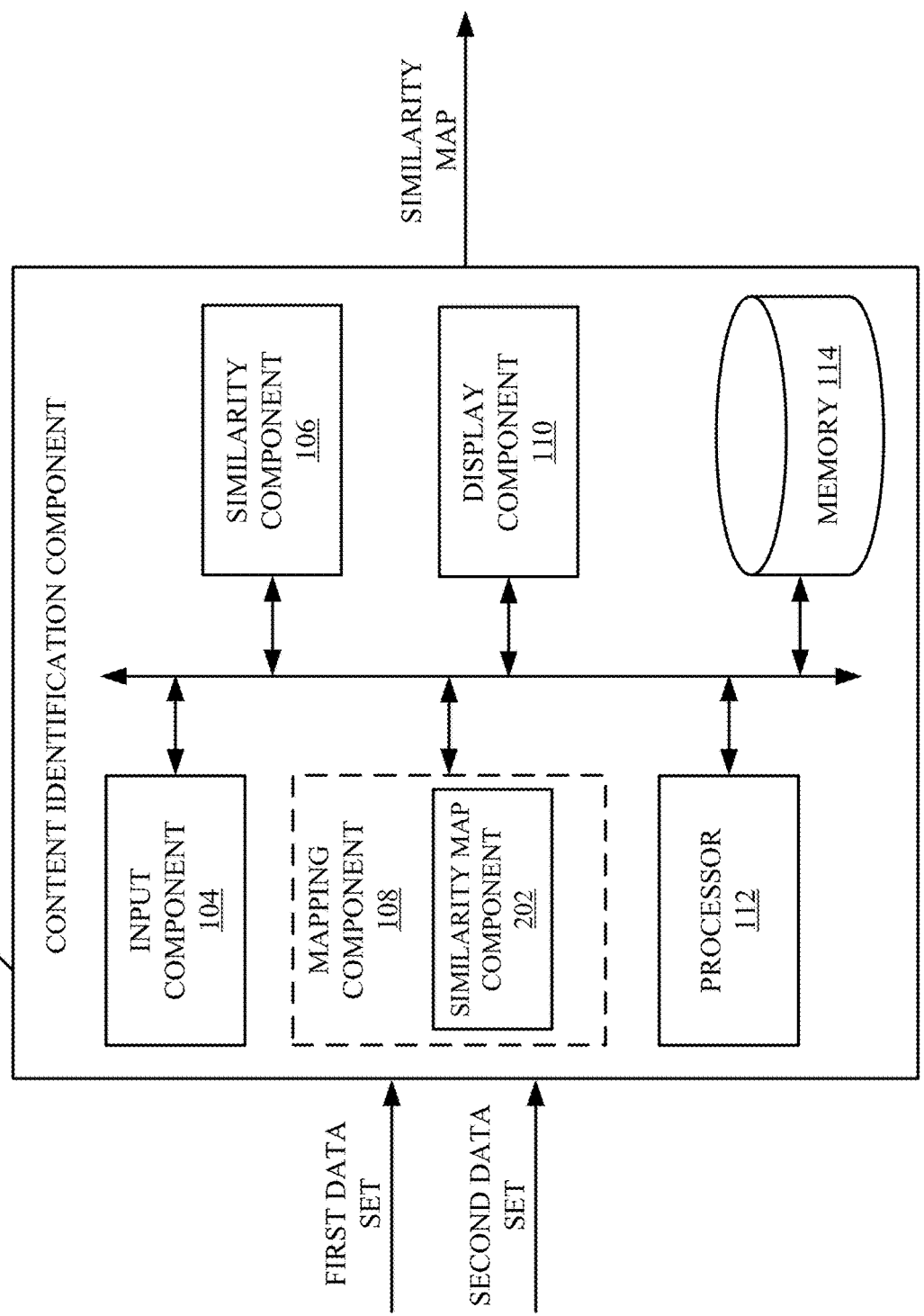
FIG. 2 illustrates a high-level block diagram of another content identification component, in accordance with various aspects and implementations described herein.

Referring now to FIG. 2, there is illustrated a non-limiting implementation of a system 200 in accordance with various aspects and implementations of this disclosure. The system 200 includes the content identification component 102. The content identification component 102 includes the input component 104, the similarity component 106, the mapping component 108 and the display component 110. The mapping component 108 can include at least a similarity map component 202.

The similarity map component 202 can generate and/or configure a similarity map (e.g., a heat map, a similarity heat map, a high entropy heat map, etc.) based on similarities determined by the similarity component 106. In one example, the similarity map can be an image that predicts how similar the first media item is to the second media item at each point in time. The similarity map component 202 can configure a data point of the similarity map to represent a match between data of the first data set and other data of the second data set. The similarity map generated by the similarity map component 202 can represent associations between two data sets (e.g., the first data set and the second data set). In an example where the first data set and the second data set are representative of two videos (or portions of two videos), a similarity map of similarity between the two videos can be generated. In an aspect, the similarity map can be a data matrix where a first axis represents different parts of a first content item and a second axis represents different parts of another content item (e.g., information representative of similarities between respective parts of the first media item and the second media item can be mapped in a data matrix wherein one axis represents different parts of a first content item and a second axis represents different parts of another content item). For example, a data point (e.g., a data entry) of the similarity heat map (e.g., the data matrix) can be associated with a particular point in time for data related to the first media item and the second media item. A data entry at each coordinate or cell of the matrix can include a value representative of the degree of similarity (e.g., a similarity score) between respective parts of the two content items represented by the coordinates.

The similarity map generated by the similarity map component 202 can be associated with a similarity computation. The similarity computation associated with the similarity map can be related to a non-linear function that accounts for number of data points that are associated with and/or identified based on the same information. In certain aspects, the similarity computation associated with the similarity map can be computed so that each new piece of information associated with the first media item and the second media item (e.g., each new piece of information associated with the first data set and the second data) occurs exactly once in the similarity map. Therefore, matches computed using the similarity map generated by the similarity map component 202 can provide greater precision (e.g., more accurate and/or efficient matches). Moreover, the similarity map generated by the similarity map component 202 can be associated with less data and/or lower storage requirements than conventional heat maps.

In a non-limiting example, a similarity map generated by the similarity map component 202 can represents similarities between two videos. For example, a similarity map generated by the similarity map component 202 can mark Hamming distances or Jaccard distances between video fingerprints for videos A and B. A similarity map generated by the similarity map component 202 can be displayed as graphical image wherein each point or pixel of the image corresponds to individual values in a data matrix that compares similarity values for the two videos. For example, a similarity map generated by the similarity map component 202 can correspond to a data matrix where each point or pixel in the similarity map corresponds to a value at a coordinate (e.g., an (x, y) coordinate) of data matrix. In the data matrix associated with the similarity map generated by the similarity map component 202, one axis can represent respective points in time for a first video, video A, and the other axis can represent respective points in time for a second video, video B. The points in time can mark individual video frames, groups of video frames, segment of video between two time markers, etc. In an aspect, the points in time along each axis represent sequential points in time of the respective videos. However, in other aspects, the points in time along each axis can represent non-sequential points in time of the respective videos. In addition, the data matrix associated with the similarity map generated by the similarity map component 202 can be clustered, filtered, etc., in various manners to rearrange the order of the respective rows and columns.

Figure 3:
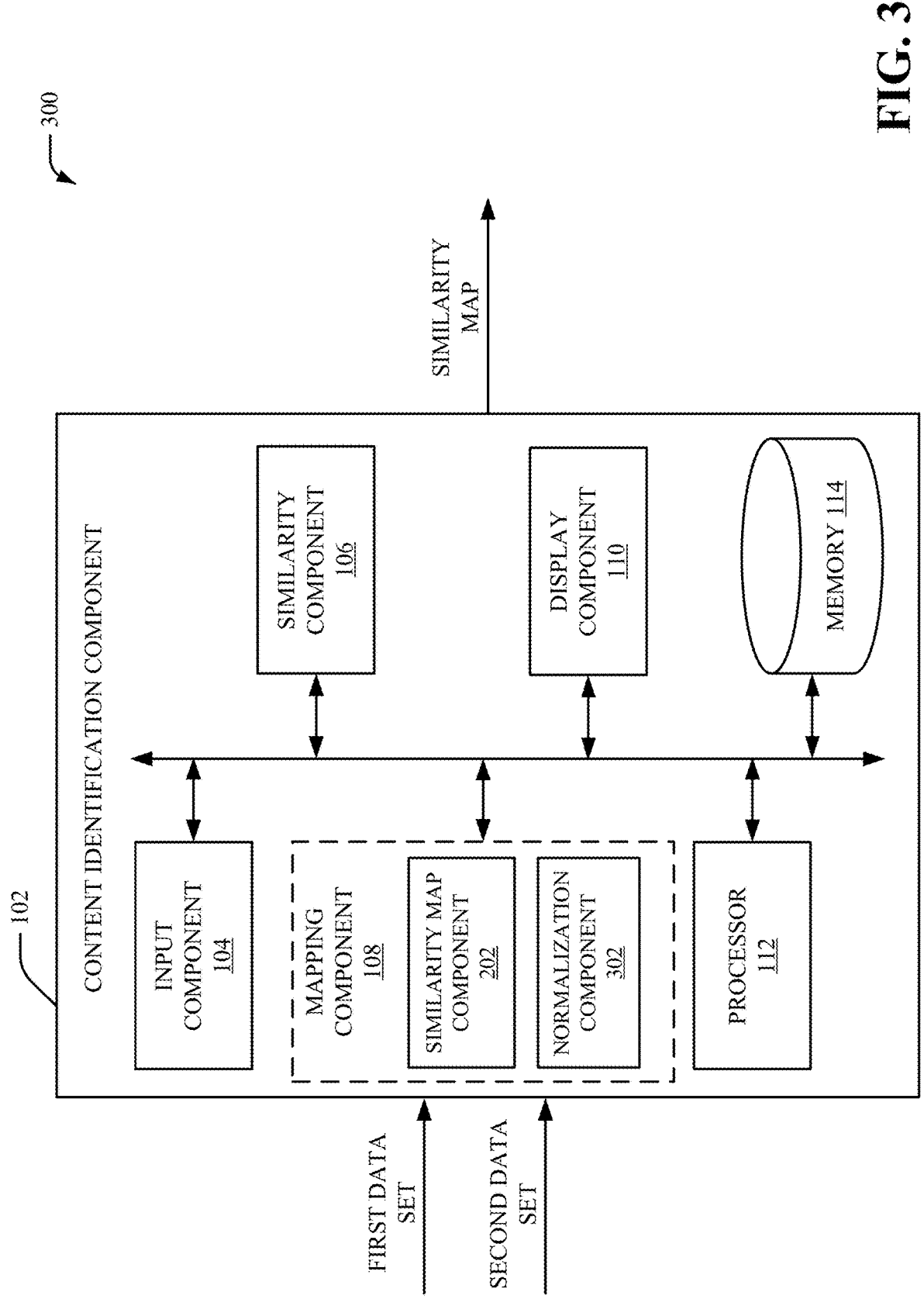
FIG. 3 illustrates a high-level block diagram of yet another example content identification component, in accordance with various aspects and implementations described herein.

Referring now to FIG. 3, there is illustrated a non-limiting implementation of a system 300 in accordance with various aspects and implementations of this disclosure. The system 300 includes the content identification component 102. The content identification component 102 includes the input component 104, the similarity component 106, the mapping component 108 and the display component 110. The mapping component 108 can include the similarity map component 202 and/or a normalization component 302.

The normalization component 302 can be configured to compensate for random noise and/or random values associated with a similarity (e.g., a similarity computation) computed by the similarity component 106. For example, the normalization component 302 can normalize a similarity score (e.g., a min-hash band value score, etc.) generated by the similarity component 106. In an aspect, normalization component 302 can normalize the information associated with the similarity between data of the first data set and other data of the second data set. Additionally, the normalization component 302 can normalize the previously determined information associated with the other similarity between the first data set and the second data set. In another aspect, a number of similarity hits associated with the similarity map can be divided by a number of hits determined by another similarity technique (e.g., a similarity technique not implemented by the similarity component, a similarity technique that generates redundant data in a similarity map, a standard similarity technique, etc.). In yet another aspect, normalization associated with the normalization component 302 can be determined based on the number of all matching data points (including data points associated with the same information) and the number of matching points associated with unique information. It is to be appreciated that the normalization component 302 can additionally or alternatively perform normalization based on other information generated by and/or associated with the similarity component 106 and/or the mapping component 108.

Referring now to FIG. 4, there is illustrated a non-limiting implementation of a system 400 in accordance with various aspects and implementations of this disclosure. The system 400 includes the content identification component 102. The content identification component 102 includes the input component 104, the similarity component 106, the mapping component 108, the display component 110 and/or an analysis component 402. In an implementation, the content identification component 102 can be implemented without the display component 110. The mapping component 108 can include the similarity map component 202 and/or the normalization component 302.

The analysis component 402 can process and/or analyze the similarity map to identify same or substantially similar data included in the first data set and the second data set. For example, the analysis component 402 can determine whether the first media item matches the second media item based on the similarity map. The analysis component 402 can determine whether the first media item matches the second media item based on a sequence alignment technique associated with the similarity map. Alternatively, the analysis component 402 can determine whether the first media item matches the second media item based on a Hough transform technique associated with the similarity map. However, it is to be appreciated that the analysis component 402 can employ a different technique to determine whether the first media item matches the second media item based on the similarity map. The analysis component 402 can output and/or store content identification information (e.g., CONTENT IDENTIFICATION INFORMATION shown in FIG. 4) that is associated with the analysis of the similarity map. In an aspect, the display component 110 can display analysis information (e.g., one or more matches, content identification information) generated by the analysis component 402 on a display screen of a device.

Figures 5A, 5B:
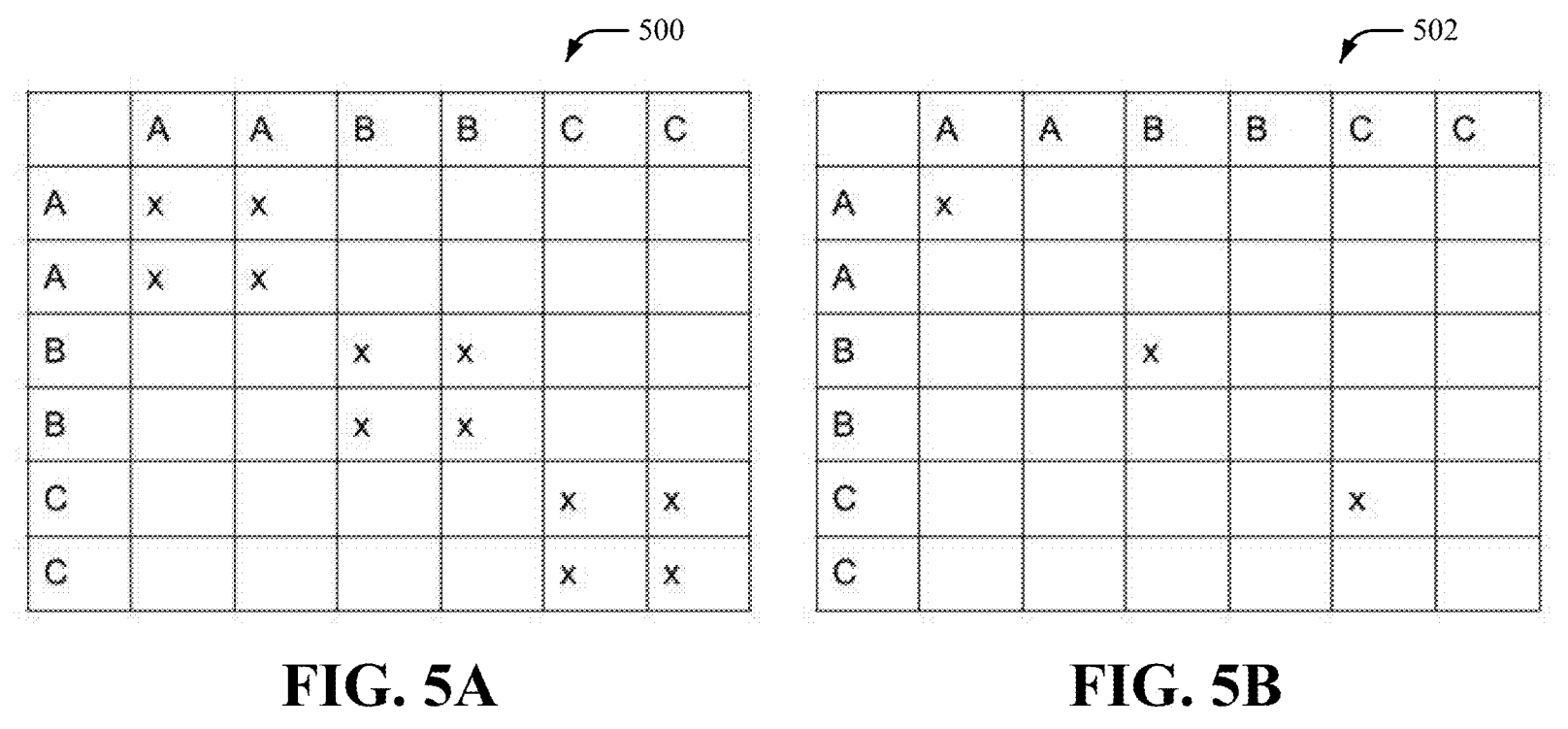

FIG. 5A illustrates a similarity map 500 that includes redundant information (e.g., generated without the content identification component 102), and FIG. 5B illustrates a non-limiting implementation of a similarity map 502 in accordance with various aspects and implementations of this disclosure (e.g., the similarity map 502 can be generated by the content identification component 102). A horizontal axis of the similarity map 500 and the similarity map 502 can be associated with min-hash band values "AABBCC" for a first media item. Similarly, a vertical axis of the similarity map 500 and the similarity map 502 can be associated with min-hash band values "AABBCC" for a second media item. In one example, min-hash band values "AABBCC" can be associated with a single hash (e.g., a single hash band) for a single point in time related to a media item. However, it is to be appreciated that the "AABBCC" values shown in the similarity map 500 and the similarity map 502 can be associated with other data (e.g., other feature detection data, other spectrogram data, other content fingerprint data, other hashing scheme data, etc.). An "X" shown in the similarity map 500 and the similarity map 502 can be associated with a match (e.g., a hit) and/or a similarity score (e.g., a positive similarity score, a positive min-hash band value score, a score associated with a scoring function, etc.).

As shown in FIG. 5A, a similarity measure (e.g., a measure used to generate each pixel in the similarity map 500) can contain redundant information (e.g., the same information occurs in the similarity map 500 multiple times). For example, a match between a min-hash band value "A" in the first media item and a min-hash band value "A" in the second media item can occur four times in the similarity map 500. Similarly, a match between a min-hash band value "B" in the first media item and a min-hash band value "B" in the second media item can occur four times in the similarity map 500, etc. As such, with the similarity map 500, matching segments between the first media item and the second media item can be incorrectly identified. This can occur since the similarity map 500 could show high similarity between the first media item and the second media item, whereas numerous matches between min-hash band values are merely reoccurrences of the same similarity and/or does not increase probability of a true match.

In contrast, as shown in FIG. 5B, the content identification component 102 can employ a similarity computation for the similarity map 502 so that each min-hash band value match occurs exactly once. For example, a match between a min-hash band value "A" in the first media item and a min-hash band value "A" in the second media item can occur only once in the similarity map 502 (e.g., rather than four times in the similarity map 500). Similarly, a match between a min-hash band value "B" in the first media item and a min-hash band value "B" in the second media item can occur only once in the similarity map 502 (e.g., rather than four times in the similarity map 500), etc. Therefore, each unique min-hash band value score is only associated with a single match (e.g., a single hit) in the similarity map 502 by employing the content identification component 102. Moreover, as compared to the similarity map 500, the similarity map 502 can provide a more precise measurement of probability of a match between the first media item and the second media item.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 6:
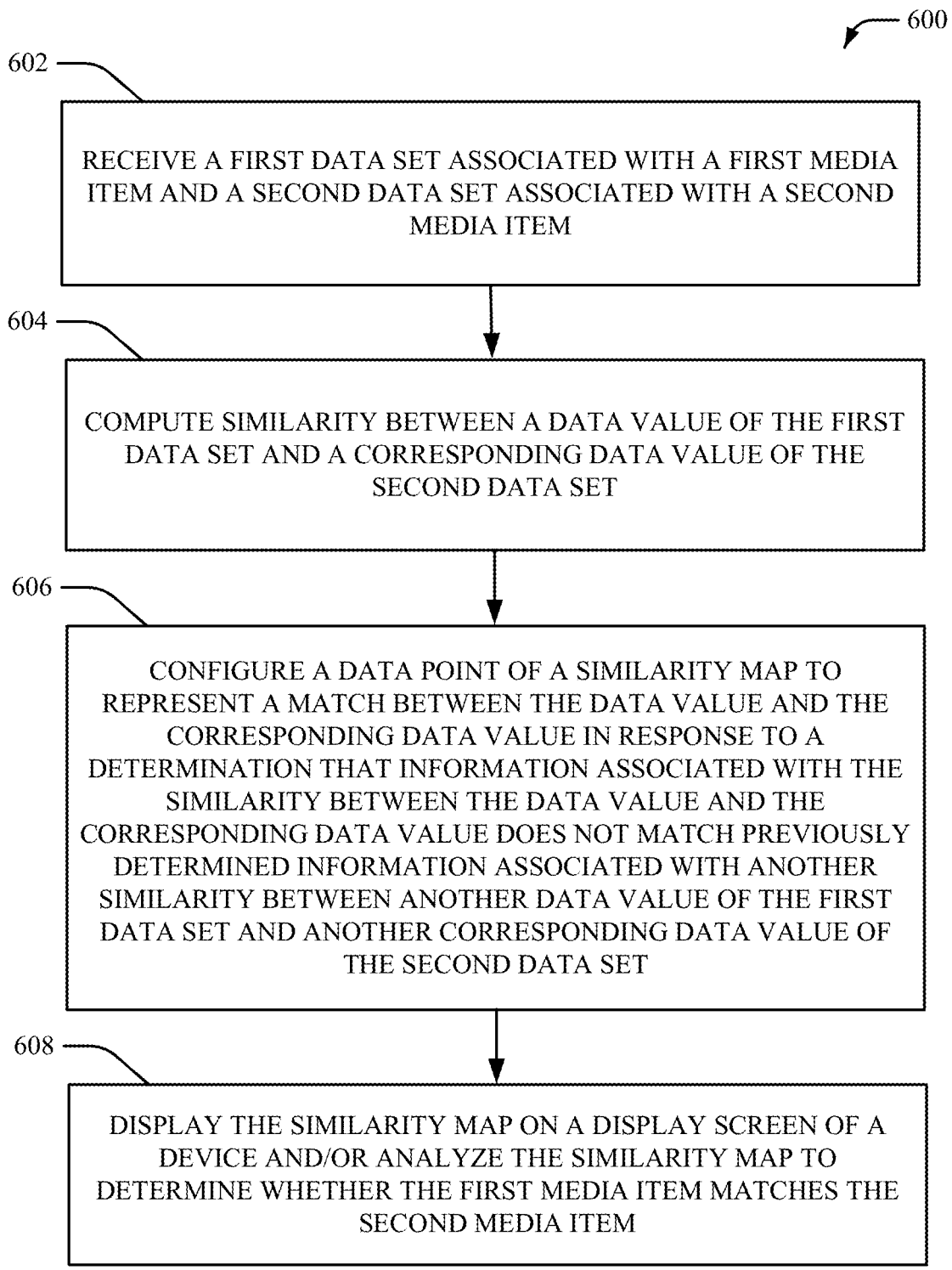
FIG. 6 depicts a flow diagram of an example method for generating a similarity heat map representative of similarities between two data sets, in accordance with various aspects and implementations described herein.

Referring to FIG. 6, there illustrated is a methodology 600 for generating a similarity heat map representative of similarities between two data sets, according to an aspect of the subject innovation. As an example, methodology 600 can be utilized in various applications, such as, but not limited to, media content systems, media content matching systems, media sharing systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, etc. At 602, a first data set associated with a first media item and a second data set associated with a second media item are received (e.g., by an input component 104). The first data set and/or the second data set can be associated with feature detection data, spectrogram data, content fingerprint data (e.g., audio fingerprint data and/or video fingerprint data), hashing scheme data, min-hash values, etc.

At 604, a similarity between a data value of the first data set and a corresponding data value of the second data set is computed (e.g., by a similarity component 106). For example, a similarity between a data value of the first data set and a corresponding data value of the second data set is computed based on a distance metric (e.g., a Hamming distance, a Jaccard distance, etc.). In an aspect, the similarity between the data value of the first data set and the corresponding data value of the second data set can be a similarity score. The data value and the corresponding data value can be associated with a corresponding time range. Therefore, the data value of the first data set can be a range of data values and the corresponding data value of the second data set can be a corresponding range of data values.

At 606, a data point of a similarity map is configured (e.g., by a mapping component 108) to represent a match between the data value and the corresponding data value in response to a determination that information associated with the similarity between the data value and the corresponding data value does not match previously determined information associated with another similarity between another data value of the first data set and another corresponding data value of the second data set. For example, the similarity map can be configured so that information associated with the similarity between the data value of the first data set and the corresponding data value of the second data set is uniquely included (e.g., only occurs once) in the similarity map.

At 608, the similarity map is displayed (e.g., by a display component 110) on a display screen of a device and/or the similarity map is analyzed (e.g., by the analysis component 402) to determine whether the first media item matches the second media item. For example, the similarity map can be stored and/or displayed to facilitate analysis of the similarity map. Additionally or alternatively, a sequence alignment technique and/or a Hough transform technique associated with the similarity map can be employed to determine whether the first media item matches the second media item.

Figure 7:
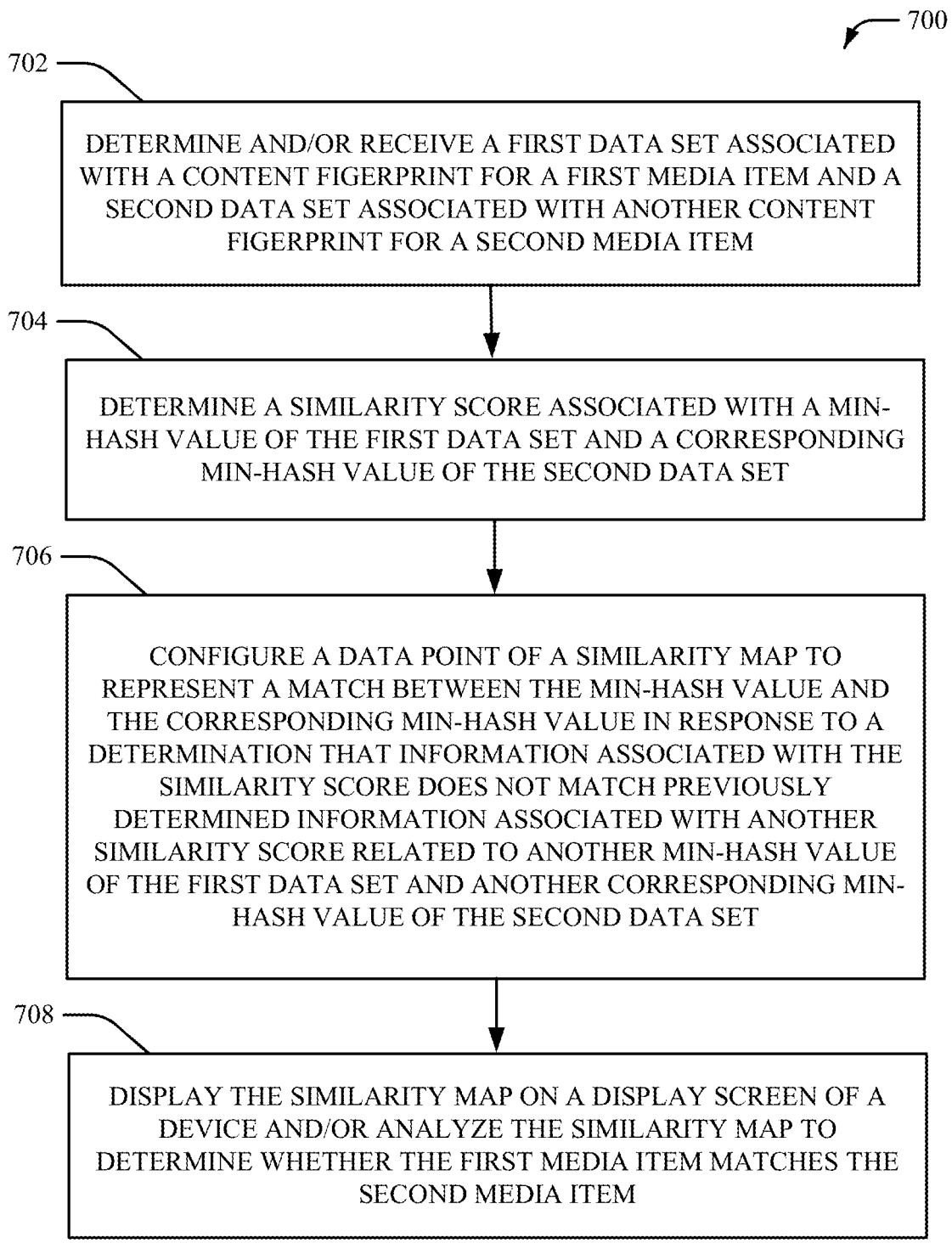
FIG. 7 depicts a flow diagram of another example method for generating a similarity heat map representative of similarities between two data sets, in accordance with various aspects and implementations described herein.

Referring to FIG. 7, there illustrated is an example methodology 700 for generating a similarity heat map representative of similarities between two data sets. At 702, a first data set associated with a content fingerprint for a first media item and a second data set associated with another content fingerprint for a second media item are determined and/or received (e.g., by an input component 104). At 704, a similarity score associated with a min-hash value of the first data set and a corresponding min-hash value of the second data set is determined (e.g., by a similarity component 106). At 706, a data point of a similarity map is configured (e.g., by a mapping component 108) to represent a match between the min-hash value and the corresponding min-hash value in response to a determination that information associated with the similarity score does not match previously determined information associated with another similarity score related to another min-hash value of the first data set and another corresponding min-hash value of the second data set. At 708, the similarity map is displayed (e.g., by a display component 110) on a display screen of a device and/or the similarity map is analyzed (e.g., by the analysis component 402) to determine whether the first media item matches the second media item.

Figure 8:
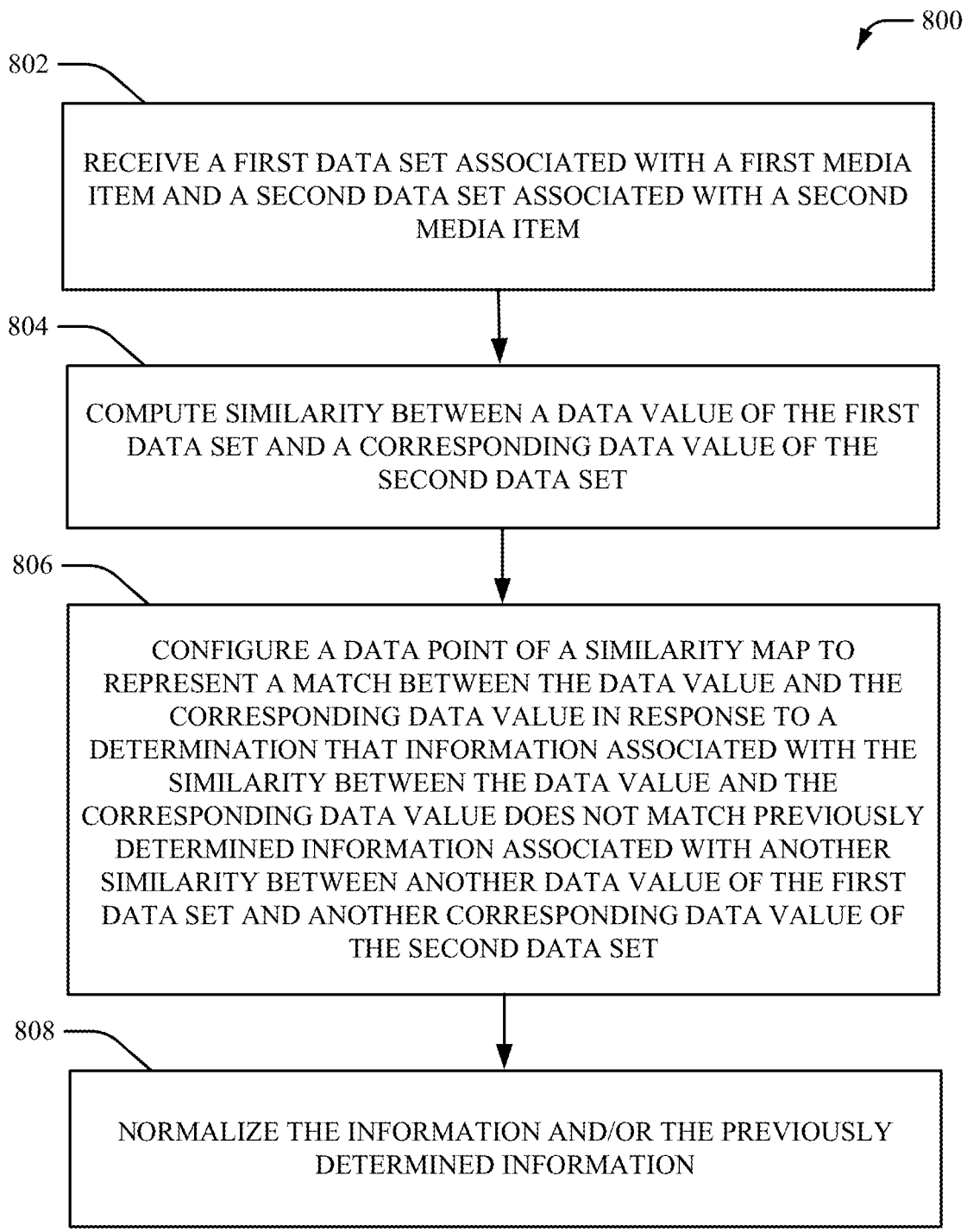
FIG. 8 depicts a flow diagram of yet another example method for generating a similarity heat map representative of similarities between two data sets, in accordance with various aspects and implementations described herein.

Referring to FIG. 8, there illustrated is an example methodology 800 for generating a similarity heat map representative of similarities between two data sets. At 802, a first data set associated with a first media item and a second data set associated with a second media item are received (e.g., by an input component 104). At 804, a similarity between a data value of the first data set and a corresponding data value of the second data set is computed (e.g., by a similarity component 106). At 806, a data point of a similarity map is configured (e.g., by a mapping component 108) to represent a match between the data value and the corresponding data value in response to a determination that information associated with the similarity between the data value and the corresponding data value does not match previously determined information associated with another similarity between another data value of the first data set and another corresponding data value of the second data set. At 808, the information and/or the previously determined information are normalized. For example, the information associated with the similarity between the data value and the corresponding data value can be normalized to account for noise and/or random values associated with a similarity computation. Additionally or alternatively, the previously determined information associated with the other similarity between the other data value of the first data set and the other corresponding data value of the second data set can be normalized to account for noise and/or random values associated with a similarity computation.

Figure 9:
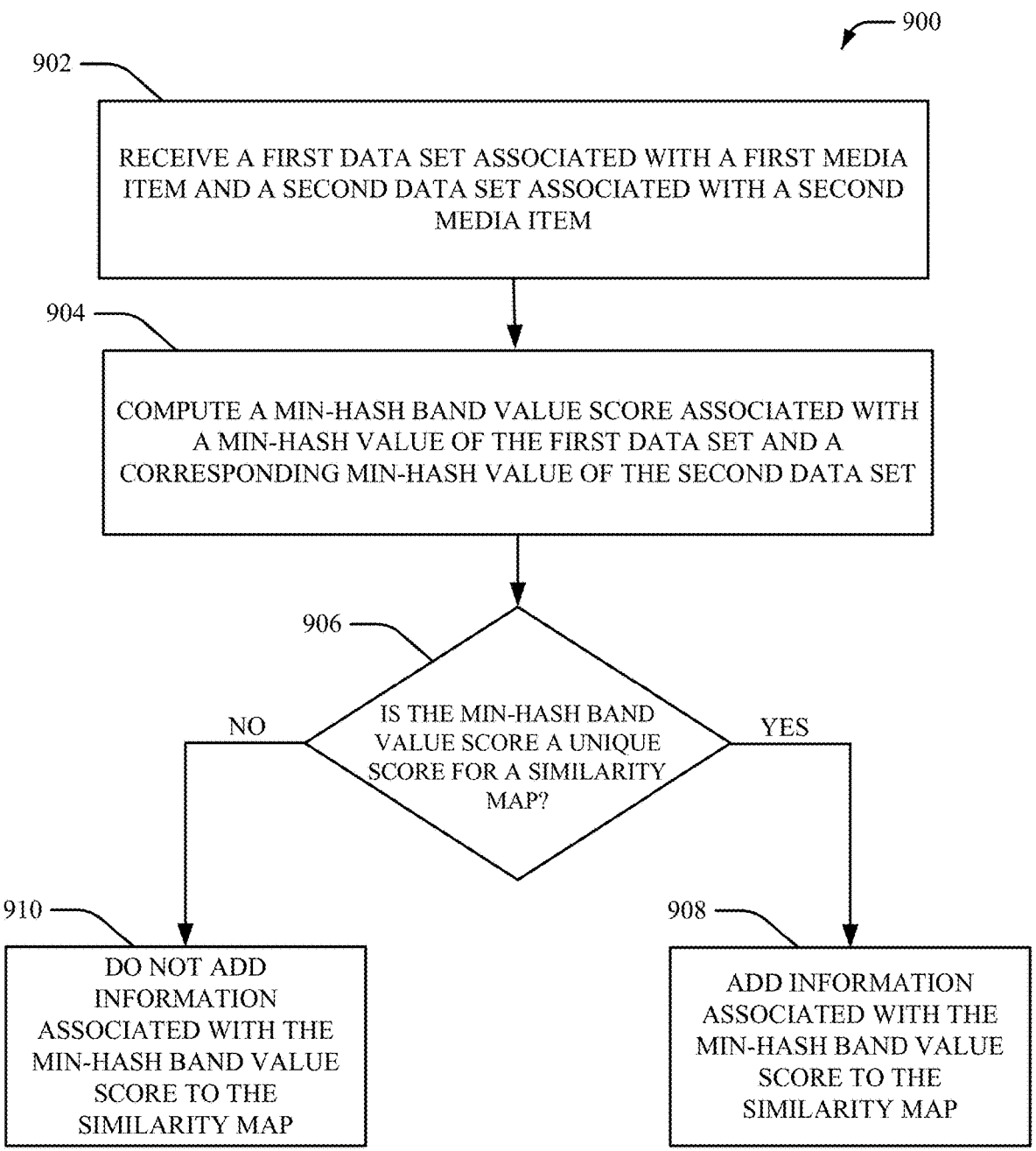
FIG. 9 depicts a flow diagram of an example method for configuring a similarity heat map representative of similarities between two data sets, in accordance with various aspects and implementations described herein.

Referring to FIG. 9, there illustrated is an example methodology 900 for configuring a similarity heat map representative of similarities between two data sets. At 902, a first data set associated with a first media item and a second data set associated with a second media item are received (e.g., by an input component 104). For example, the first data set and the second data set can include min-hash band values. At 904, a min-hash band value score associated with a min-hash value of the first data set and a corresponding min-hash value of the second data set is computed (e.g., by a similarity component 106). At 906, it is determined whether the min-hash band value score is a unique score for a similarity map. For example, it can be determined whether the min-hash band value score and/or information associated with the min-hash band value score is already included in the similarity map. If yes, the methodology 900 proceeds to 908. At 908, information associated with the min-hash band value score is added to the similarity map (e.g., by the mapping component 108). If no, the methodology 900 proceeds to 910. At 910, information associated with the min-hash band value score is not added to the similarity map. For example, information associated with the min-hash band value score can be withheld from being added to the similarity map.

Figure 10:
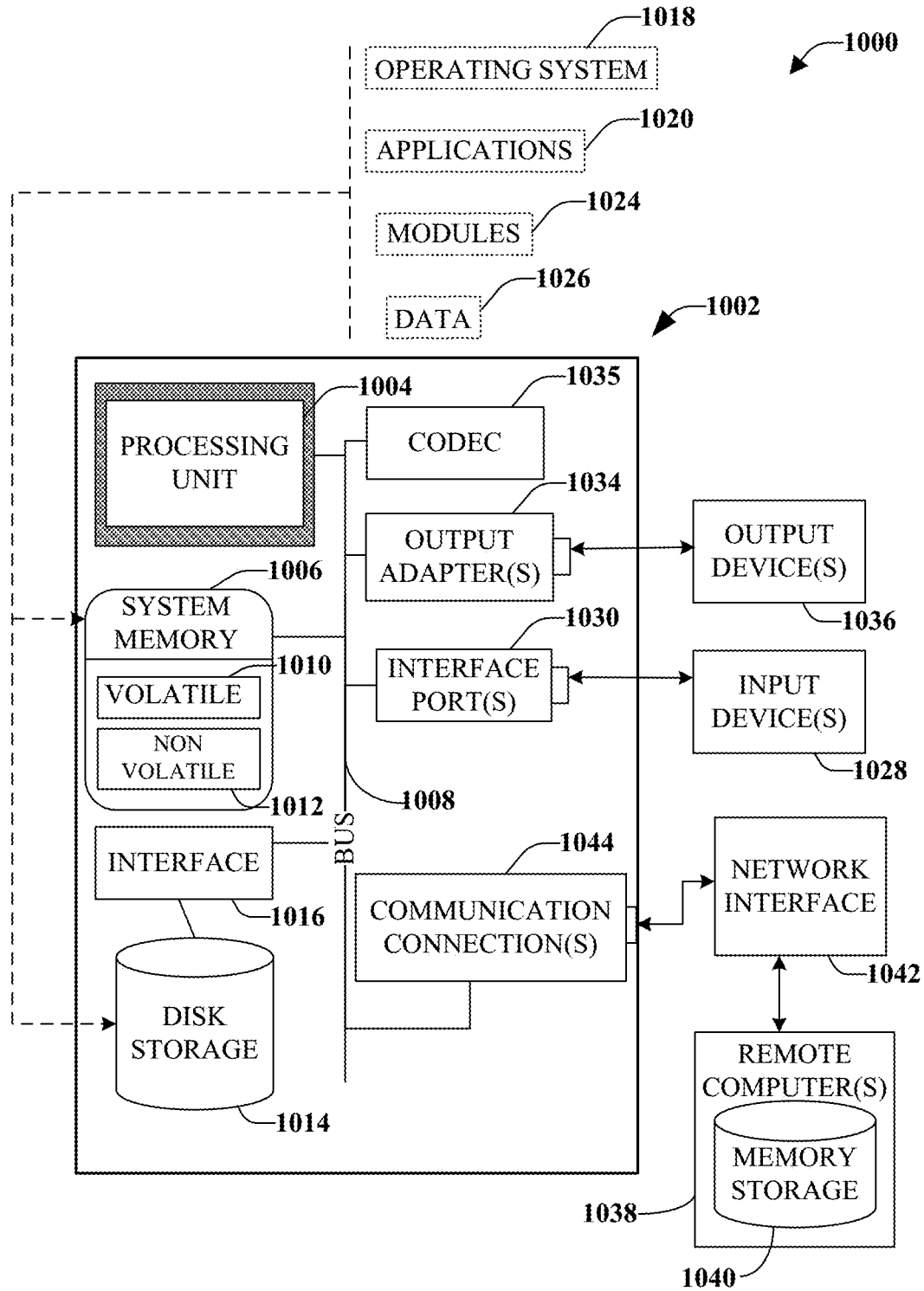
FIG. 10 is a schematic block diagram illustrating a suitable operating environment.
Figure 11:
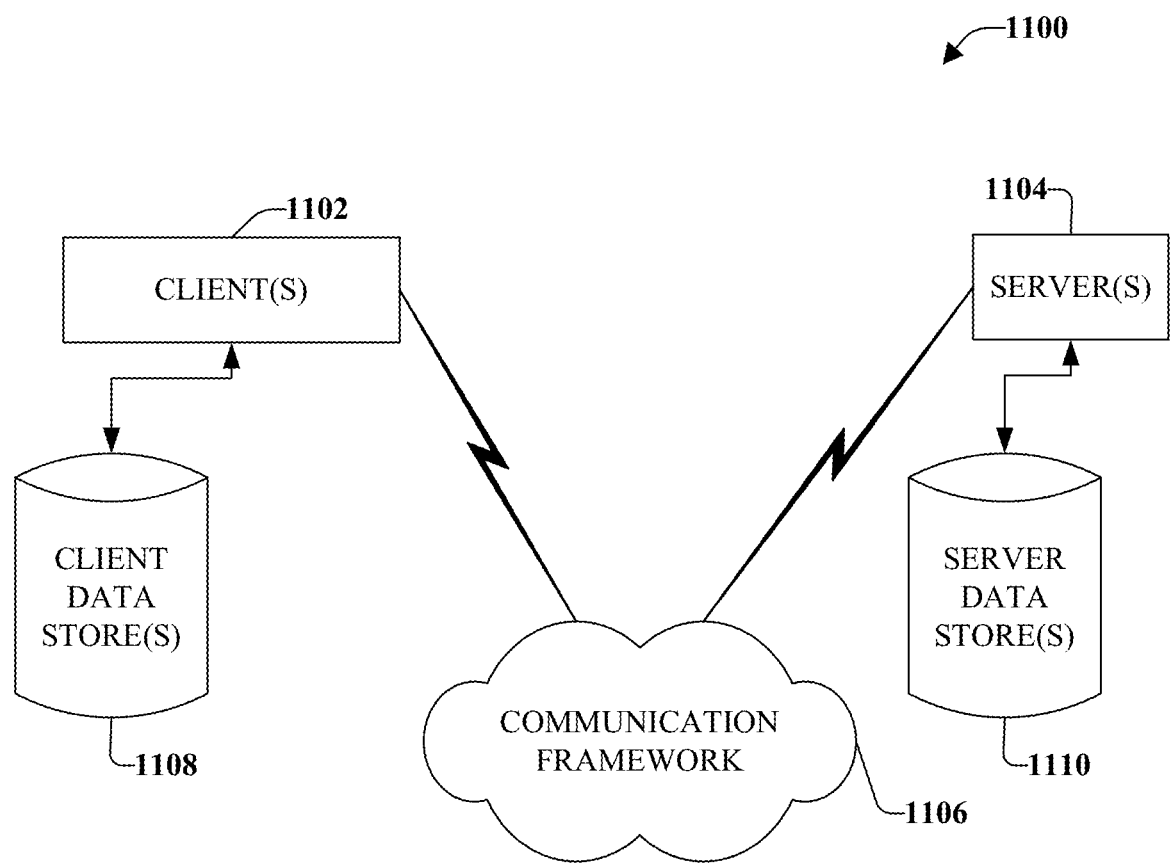
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present heat map analysis techniques. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory that stores computer executable components;
    a processor that executes the computer executable components stored in the memory to perform steps comprising:
        retrieving a reference data set describing a reference media item from a database, wherein the reference data includes a reference set of reference fingerprints generated based on a hash of a reference spectrogram of the reference media item;
        receiving a first media item, the first media item potentially including content matching the reference media item, wherein the first media item is not the reference media item;
        generating a first data set that is associated with the first media item, wherein generating the first data set includes:
            generating a spectrogram of the first media item; and
            generating a first set of first fingerprints based on the spectrogram using a hashing scheme used to generate the reference set of reference fingerprints;
        computing similarities between each first fingerprint of the first fingerprints in the first set of first fingerprints and each reference fingerprint of the reference fingerprints in the reference set of reference fingerprints;
        generating a similarity map responsive to the computed similarities, the similarity map representing matches between the data values of the first data set and the corresponding data values of the reference data set, wherein a first axis of the similarity map represents a sequence in time of parts of the first media item and a second axis of the similarity map represents a sequence in time of parts of the reference media item, and
        wherein the generating the similarity map includes:
            including only once, as a data point in the similarity map, each unique similarity value of the computed similarities, regardless of how many times any number of parts of the first media item match any number of parts of the reference media item match according to the similarity value; and analyzing the similarity map to determine whether the first media item includes content matching the reference media item.

2. The system of claim 1, wherein generating the similarity map comprises determining whether a hashing scheme value associated with the similarity between a given data value of the first data set and the corresponding given data value of the reference data set does not match another hashing scheme value associated with another similarity computed by a similarity component.

3. The system of claim 1, wherein computing similarities comprises computing similarity based on min-hash data values of the first data set and corresponding min-hash data values of the reference data set.

4. The system of claim 3, wherein the computed similarities are based on a Hamming distance between the min-hash data values and the corresponding min-hash data values.

5. The system of claim 3, wherein the computed similarities are based on a Jaccard distance between the min-hash data values and the corresponding min-hash data values.

6. The system of claim 1, wherein analyzing the similarity map comprises determining whether the first media item includes content matching the reference media item based on a sequence alignment technique associated with the similarity map.

7. The system of claim 1, wherein analyzing the similarity map comprises determining whether the first media item includes content matching the reference media item based on a Hough transform technique associated with the similarity map.

8. The system of claim 1, wherein computing similarities comprises computing a score between feature detection information associated with the first media item and other feature detection information associated with the reference media item.

9. The system of claim 1, further comprising normalizing the computed similarities.

10. A method, comprising:
employing a processor that facilitates execution of computer executable instructions stored on a non-transitory computer readable medium to implement operations, comprising:
retrieving a reference data set describing a reference media item from a database, wherein the reference data includes a reference set of reference fingerprints generated based on a hash of a reference spectrogram of the reference media item;
receiving a first media item, the first media item potentially including content matching the reference media item, wherein the first media item is not the reference media item;
generating a first data set that is associated with the first media item, wherein generating the first data set includes:
generating a spectrogram of the first media item; and
generating a first set of first fingerprints based on the spectrogram using a hashing scheme used to generate the reference set of reference fingerprints;
computing similarities between each first fingerprint of the first fingerprints in the first set of first fingerprints and each reference fingerprint of the reference fingerprints in the reference set of reference fingerprints;
generating a similarity map responsive to the computed similarities, the similarity map representing matches between the data values of the first data set and the corresponding data values of the reference data set,
wherein a first axis of the similarity map represents a sequence in time of parts of the first media item and a second axis of the similarity map represents a sequence in time of parts of the reference media item, and
wherein the generating the similarity map includes:
including only once, as a data point in the similarity map, each unique similarity value of the computed similarities, regardless of how many times any number of parts of the first media item match any number of parts of the reference media item match according to the similarity value; and
analyzing the similarity map to determine whether the first media item includes content matching the reference media item.

11. The method of claim 10, wherein the receiving comprises receiving content fingerprint data associated with the first media item.

12. The method of claim 10, wherein the receiving comprises receiving a set of hash values associated with the first media item.

13. The method of claim 12, wherein computing similarities comprises computing a Hamming distance between the set of hash values and corresponding hash values for the reference data set.

14. The method of claim 12, wherein computing similarities comprises computing a Jaccard distance between the set of hash values and corresponding hash values for the reference data set.

15. The method of claim 10, further comprising:
normalizing the computed similarities.

16. A non-transitory computer readable storage medium comprising computer-executable instructions, that in response to execution, cause a computing system to perform operations, comprising:
retrieving a reference data set describing a reference media item from a database, wherein the reference data includes a reference set of reference fingerprints generated based on a hash of a reference spectrogram of the reference media item;
receiving a first media item, the first media item potentially including content matching the reference media item, wherein the first media item is not the reference media item;
generating a first data set that is associated with the first media item, wherein generating the first data set includes:
generating a spectrogram of the first media item; and
generating a first set of first fingerprints based on the spectrogram using a hashing scheme used to generate the reference set of reference fingerprints;
computing similarities between the first fingerprints in the first set of first fingerprints and the reference fingerprints in the reference set of reference fingerprints;
generating a similarity map responsive to the computed similarities, the similarity map representing matches between the data values of the first data set and the corresponding data values of the reference data set,
wherein a first axis of the similarity map represents a sequence in time of parts of the first media item and a second axis of the similarity map represents a sequence in time of parts of the reference media item, and
wherein the generating the similarity map includes:
including only once, as a data point in the similarity map, each unique similarity value of the computed similarities, regardless of how many times any number of parts of the first media item match any number of parts of the reference media item match according to the similarity value; and analyzing the similarity map to determine whether the first media item includes content matching the reference media item.

17. The non-transitory computer readable storage medium of claim 16, the operations further comprising:

normalizing the computed similarities.

* * * * *